(12) United States Patent
Adrangi et al.

(10) Patent No.: US 6,687,846 B1
(45) Date of Patent: Feb. 3, 2004

(54) SYSTEM AND METHOD FOR ERROR HANDLING AND RECOVERY

(75) Inventors: Farid Adrangi, Beaverton, OR (US);
Rama R. Menon, Portland, OR (US);
Reed J. Sloss, Beaverton, OR (US);
David W. Gaddis, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,271

(22) Filed: Mar. 30, 2000

(51) Int. Cl.[7] ................................................ G06F 11/00
(52) U.S. Cl. ................................ 714/4; 714/17; 714/43
(58) Field of Search .............................. 714/4, 17, 704, 714/748, 774, 15, 1, 2, 29, 37, 43, 42, 48, 49

(56) References Cited

U.S. PATENT DOCUMENTS

| | | | |
|---|---|---|---|
| 4,845,614 A | * 7/1989 | Hanawa et al. | ............... 714/16 |
| 4,866,712 A | * 9/1989 | Chao | ........................ 714/704 |
| 4,920,432 A | 4/1990 | Eggers et al. | |
| 4,949,187 A | 8/1990 | Cohen | |
| 4,949,248 A | 8/1990 | Caro | |
| 5,172,413 A | 12/1992 | Bradley et al. | |
| 5,253,341 A | 10/1993 | Rozmanith et al. | |
| 5,291,554 A | 3/1994 | Morales | |
| 5,371,532 A | 12/1994 | Gelman et al. | |
| 5,410,343 A | 4/1995 | Coddington et al. | |
| 5,414,455 A | 5/1995 | Hooper et al. | |
| 5,440,688 A | * 8/1995 | Nishida | ........................ 714/4 |
| 5,442,389 A | 8/1995 | Blahut et al. | |
| 5,442,390 A | 8/1995 | Hooper et al. | |
| 5,442,749 A | 8/1995 | Northcutt et al. | |
| 5,463,768 A | * 10/1995 | Cuddihy et al. | ............... 714/37 |
| 5,475,615 A | 12/1995 | Lin | |
| 5,508,732 A | 4/1996 | Bottomley et al. | |

(List continued on next page.)

FOREIGN PATENT DOCUMENTS

| | | |
|---|---|---|
| EP | 0 649 121 A2 | 10/1994 |
| EP | 0 651 554 A1 | 10/1994 |
| WO | WO9742582 A | 11/1997 |
| WO | WO 9859486 | 12/1998 |
| WO | WW 9948246 A | 9/1999 |

OTHER PUBLICATIONS

"A Hierarchical Internet Object Cache", Chankhunthod, et al., Computer Science Dept., University of Colorado–Boulder, 11 pp.

"Network Caching Guide Optimizing Web Content Delivery", Michael A. Goulde, Mar. 1999, pp. i–ii, 1–42.

Vin, Harrick, Multimedia Broadcasting Over The Internet: Part 1, Oct, 1998, IEEE Multimedia, IEEE Computer Society, US, vol. 5, NR.4, pp.: 78–82 XP000788442, ISN: 1070–986X—Entire document.

(List continued on next page.)

*Primary Examiner*—Robert Beausoliel
*Assistant Examiner*—Marc Duncan
(74) *Attorney, Agent, or Firm*—Blakely, Sokoloff, Taylor & Zafman LLP

(57) ABSTRACT

A system and method for error handling and recovery in a content distribution system is described in which errors corresponding to failed file operations (e.g., file transfer errors, file delete errors) are placed in an error queue. Error analysis logic reads the errors from the error queue and makes a determination as to whether the file operation errors are recoverable errors based on an error recovery policy. If the error analysis logic determines that recovery is possible, then one or more error recovery procedures are invoked. The procedures may be specific to the content delivery system (e.g., "Server X was down on 1/20 between 10:20 and 11:00 AM"), or may be more general (e.g., "attempt file transfers 5 times before quitting"). If it is determined that an error is not automatically recoverable, then the error is included in an error report.

12 Claims, 16 Drawing Sheets

U.S. PATENT DOCUMENTS

| | | |
|---|---|---|
| 5,515,511 A | 5/1996 | Nguyen et al. |
| 5,519,435 A | 5/1996 | Anderson |
| 5,528,281 A | 6/1996 | Grady et al. |
| 5,544,313 A | 8/1996 | Shachnai et al. |
| 5,544,327 A | 8/1996 | Dan et al. |
| 5,550,577 A | 8/1996 | Verbiest et al. |
| 5,550,863 A | 8/1996 | Yurt et al. |
| 5,550,982 A | 8/1996 | Long et al. |
| 5,557,317 A | 9/1996 | Nishio et al. |
| 5,614,940 A | 3/1997 | Cobbley et al. |
| 5,704,031 A * | 12/1997 | Mikami et al. ............... 714/4 |
| 5,933,835 A | 8/1999 | Adams et al. |
| 5,956,716 A | 9/1999 | Kenner et al. |
| 6,003,030 A | 12/1999 | Kenner et al. |
| 6,016,509 A | 1/2000 | Dedrick |
| 6,112,239 A | 8/2000 | Kenner et al. |
| 6,122,752 A * | 9/2000 | Farah ......................... 714/2 |
| 6,408,407 B1 * | 6/2002 | Sadler ........................ 714/57 |
| 6,446,224 B1 * | 9/2002 | Chang et al. ................. 714/54 |

OTHER PUBLICATIONS

Rodriguez, P. et al, "Improving the WWW: Caching or Multicast?", Computer Networks and ISDN Systems, North Holland Publishing, Amsterdam, NL, vol. 30, No. Nov. 22–23, 1998, pp. 2223–2243, ISSN: 0169-7552.

Berra, P.B., et al., "Architecture for Distributed Database Systems," *Computer Communications*, vol. 13, No. 4, May 1, 1990, pp. 217–231.

Little, T.D.C., et al., "Selection and Disseminatrion of Digital Video via the Virtual Video Broswer," *Multimedia Tools and Applications*, vol. 1, No. 2, Jun. 1995 (Netherlands), pp. 149–172.

* cited by examiner

SYSTEM AND METHOD FOR ERROR HANDLING AND RECOVERY

BACKGROUND OF THE INVENTION

1. Field of the Invention

This invention relates generally to the field of network services. More particularly, the invention relates to an improved system and method for fault tolerant content distribution over a network.

2. Description of the Related Art

A traditional network caching system, as illustrated in FIG. 1, includes a plurality of clients 130–133 communicating over a local area network 140 and/or a larger network 110 (e.g., the Internet). The clients 130–133 may run a browser application such as Netscape Navigator™ or Microsoft Internet Explorer™ which provides access to information on the World Wide Web ("the Web") via the HyperText Transport Protocol ("HTTP"), or through other networking protocols (e.g., the File Transfer Protocol, Gopher . . . etc).

The browser on each client 130–133 may be configured so that all requests for information (e.g., Web pages) are transmitted through a local cache server 115, commonly referred to as a "proxy cache." When a client 130 requests information from a remote Internet server 120, the local proxy cache 115 examines the request and initially determines whether the requested content is "cacheable" (a significant amount of Internet content is "non-cacheable"). If the local proxy cache 115 detects a non-cacheable request, it forwards the request directly to the content source (e.g., Internet server 120). The requested content is then transmitted directly from the source 120 to the client 130 and is not stored locally on the proxy cache 115.

By contrast, when the proxy cache 115 determines that a client 130 content request is cacheable, it searches for a copy of the content locally (e.g., on a local hard drive). If no local copy exists, then the proxy cache 115 determines whether the content is stored on a "parent" cache 117 (located further upstream in the network relative to the Internet server 120) or a "sibling" cache 116 (located in substantially the same hierarchical position as the proxy cache relative to the Internet server 120 from which the content was requested). If a cache "hit" is detected on either neighboring cache 116, 117, the requested content is retrieved from that cache, transmitted to the client 130, and is stored locally on the proxy cache 115 to be available for future requests by other local clients 131–133. If a cache "miss" occurs, however, the content is retrieved from the source Internet server 120, transmitted to the client 130 and a copy is stored locally on the proxy cache 115, and possibly also the parent cache 117, to be available for future client requests.

BRIEF DESCRIPTION OF THE DRAWINGS

A better understanding of the present invention can be obtained from the following detailed description in conjunction with the following drawings, in which.

DETAILED DESCRIPTION

An Exemplary Network Architecture

Figure 1:
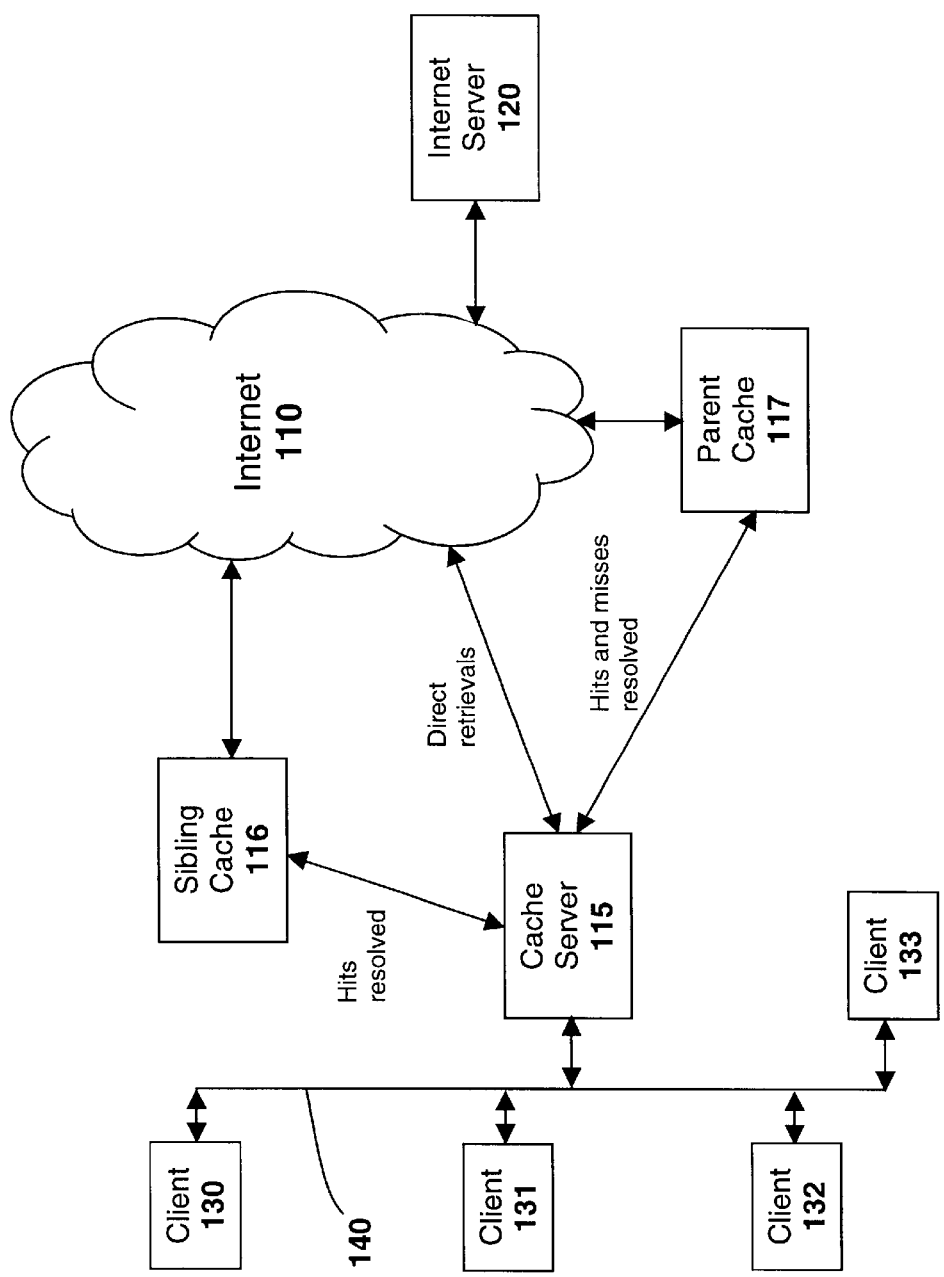
FIG. 1 illustrates a prior art caching system on a data network.
Figure 2:
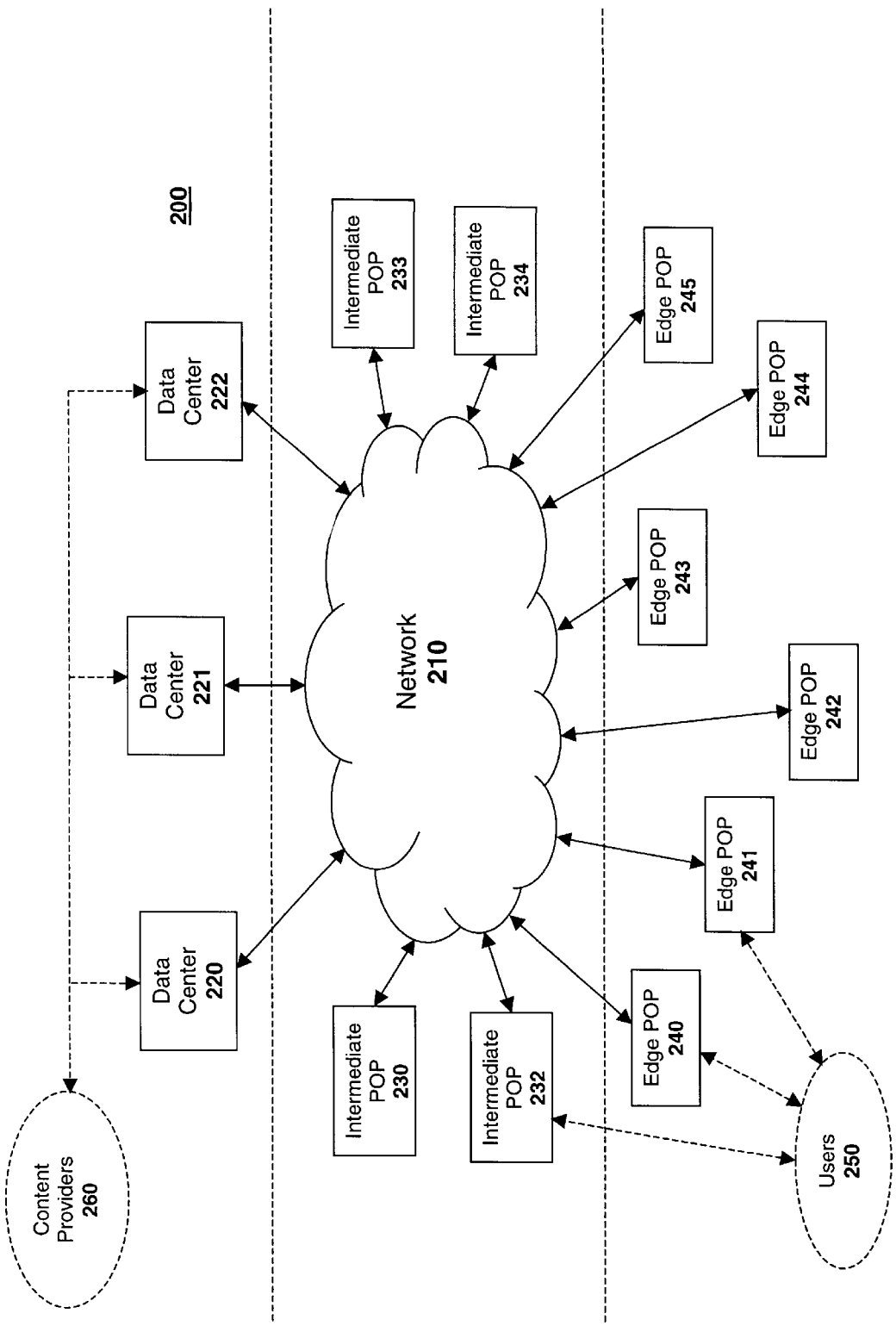
FIG. 2 illustrates an exemplary network architecture including elements of the invention.

Elements of the present invention may be included within a multi-tiered networking architecture 200 such as that illustrated in FIG. 2, which includes one or more data centers 220–222, a plurality of "intermediate" Point of Presence ("POP") nodes 230–234 (also referred to herein as "Private Network Access Points," or "P-NAPs"), and a plurality of "edge" POP nodes 240–245 (also referred to herein as "Internet Service Provider Co-Location" sites or "ISP Co-Lo" sites).

According to the embodiment depicted in FIG. 2, each of the data centers 220–222, intermediate POPs 230–234 and/or edge POPs 240–245 are comprised of groups of network servers on which various types of network content may be stored and transmitted to end users 250, including, for example, Web pages, network news data, e-mail data, File Transfer Protocol ("FTP") files, and live & on-demand multimedia streaming files. It should be noted, however, that the underlying principles of the invention may be practiced using a variety of different types of network content.

The servers located at the data centers 220–222 and POPs 230–234; 240–245 may communicate with one another and with end users 150 using a variety of communication channels, including, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular.

In addition, various networking protocols may be used to implement aspects of the system including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

In one embodiment, a database for storing information relating to distributed network content is maintained on servers at the data centers 220–222 (and possibly also at the POP nodes 230–234; 240–245). The database in one embodiment is a distributed database (i.e., spread across multiple servers) and may run an instance of a Relational Database Management System (RDBMS), such as Microsoft™ SQL-Server, Oracle™ or the like.

AN EXEMPLARY COMPUTER ARCHITECTURE

Figure 3:
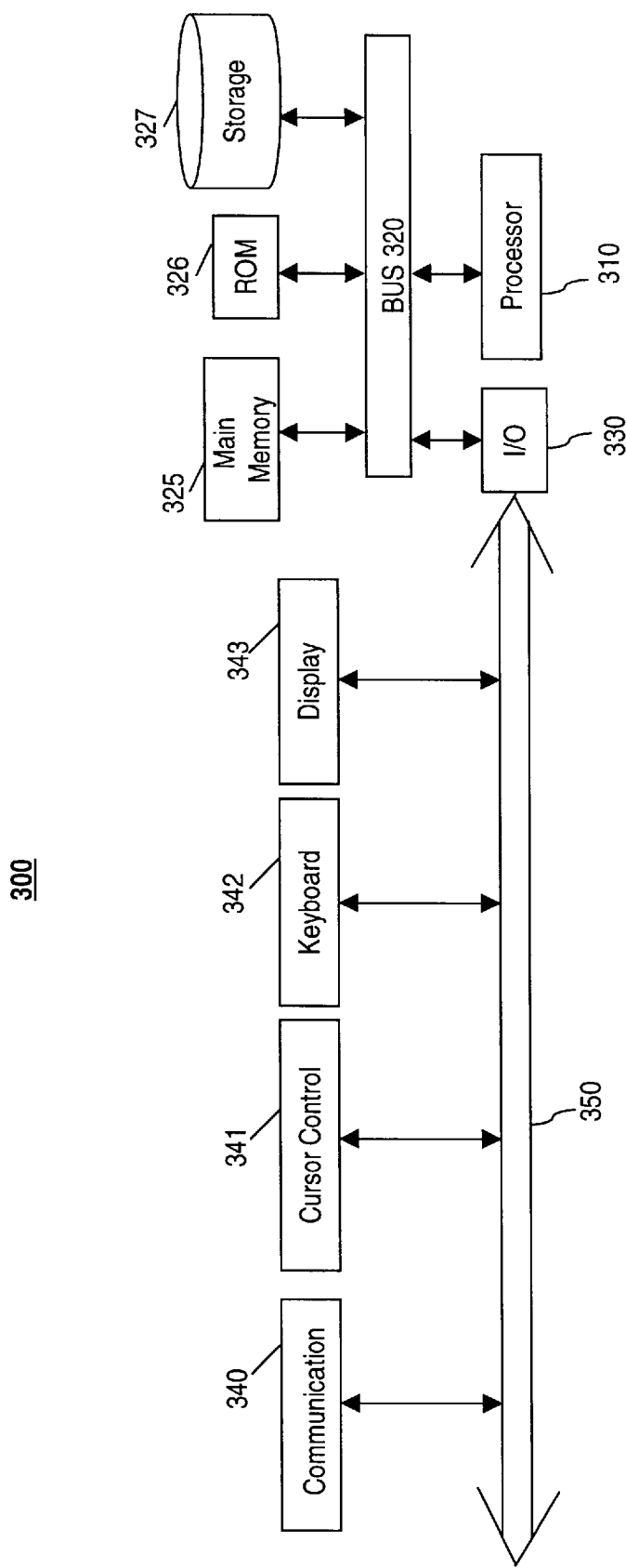
FIG. 3 illustrates an exemplary computer architecture including elements of the invention.

Having briefly described an exemplary network architecture which employs various elements of the present invention, a computer system 300 representing exemplary clients and servers for implementing elements of the present invention will now be described with reference to FIG. 3.

One embodiment of computer system 300 comprises a system bus 320 for communicating information, and a processor 310 coupled to bus 320 for processing information. The computer system 300 further comprises a random access memory (RAM) or other dynamic storage device 325 (referred to herein as "main memory"), coupled to bus 320 for storing information and instructions to be executed by processor 310. Main memory 325 also may be used for storing temporary variables or other intermediate information during execution of instructions by processor 310. Computer system 300 also may include a read only memory ("ROM") and/or other static storage device 326 coupled to bus 320 for storing static information and instructions used by processor 310.

A data storage device 327 such as a magnetic disk or optical disc and its corresponding drive may also be coupled to computer system 300 for storing information and instructions. The computer system 300 can also be coupled to a second I/O bus 350 via an I/O interface 330. A plurality of I/O devices may be coupled to I/O bus 350, including a display device 343, and/or an input device (e.g., an alphanumeric input device 342 and/or a cursor control device 341).

The communication device 340 is used for accessing other computers (servers or clients) via a network 210. The communication device 340 may comprise a modem, a network interface card, or other well known interface device, such as those used for coupling to Ethernet, token ring, or other types of computer networks.

EMBODIMENTS OF THE INVENTION

Referring back to FIG. 2, as used herein, a "content provider" 260 refers to an individual or organization with content to be distributed to end users 250 via the system and method described herein. The "content distribution service" refers to a service offered to content providers 260 by an individual or organization implementing embodiments of the network content distribution system and method described herein.

In one embodiment of the system, the data centers 220–222 serve as the primary initial repositories for network content. Thus, when a content provider 260 generates a file to be distributed to end users 250, such as, e.g., a new streaming media presentation, the content provider 260 will initially upload the content to a streaming server located at a data center 220–222. Alternatively, the content may be loaded by a member of the data center 220–222 operations staff. The file will then be automatically distributed from the data center 220–222 to one or more of the intermediate POPs 230–234, and/or edge POPs 240–245 based on an automated content distribution policy and/or end-user demand for the file (as described in more detail below).

Because the data centers 220–222 must be capable of storing and transmitting vast amounts of content provider 260 data, these facilities may be equipped with disk arrays capable of storing hundreds of terabytes of data (based on current capabilities; eventually the data centers 220–222 may be equipped with substantially greater storage capacity based on improvements in storage technology). In addition, the data centers are provided with high-bandwidth connectivity to the other data centers 220–222, intermediate POPs 230–234 and, to some extent, edge POPs 240–245. In addition, in one embodiment, the data centers 220–222 are manned at all times by an operations staff (i.e., 24-hours a day, 7 days a week).

More intermediate POPs 230–234 than data centers 220–222 are implemented in one embodiment of the system. Individually, however, the intermediate POPs 230–234 may be configured with a relatively smaller on-line storage capacity (several hundred gigabytes through one or two terabytes of storage) than the data centers 230–234. The intermediate POPs 230–234 in one embodiment are geographically dispersed across the world to provide for a more efficient content distribution scheme. These sites may also be remotely managed, with a substantial amount of network and system management support provided from the data centers 220–222 (described in greater detail below).

The edge POPs 240–245 are facilities that, in one embodiment, are smaller in scale compared with the intermediate POPs 230–234. However, substantially more geographically-dispersed edge POPs 240–245 are employed relative to the number intermediate POPs 230–234 and data centers 220–222. The edge POPs may be comprised of several racks of servers and other networking devices that are co-located with a facility owner (e.g., an Internet Service Provider). Some of the edge POPs 240–245 are provided with direct, high bandwidth connectivity (e.g., via a T1 channel or greater) to the network 210, whereas other edge POPs 240–245 are provided with only a low bandwidth "control" connectivity (e.g., typically a dial-up data connection (modem) at the minimum; although this may also include a fractional T-1 connection). Even though certain edge POP sites 230–234 are connected to the rest of the system over the Internet, the connection can be implemented such that the edge POPs 240–245 are part of a virtual private network ("VPN") that is administered from the data centers 220–222. Like the intermediate POPs 230–234, the edge POPs 240–245 may be remotely managed with network and system management support from one or more of the data centers 220–222.

Systems resources (e.g., servers, connectivity) may be deployed as modular units that can be added at data centers 220–222, intermediate POPs 230–234, and edge POPs 240–245 based on demand for particular types of content. This modularity provides for scalability at the "local" level; scalability at the "global" scope (system wide) is supported through addition of intermediate POPs 230–234 and edge POPs 240–245 as needed by the growth in content provider 260 base and additions/changes to the content distribution service.

"Local" level in this context means within a data center, intermediate POP or an edge POP. As an example, if a particular edge POP was configured with 5 streaming servers to provide, say, 5000 streams as the total capacity at that "edge", the edge POP capacity may be scaled (in accordance with one embodiment of the invention) to higher/lower values (say, to 3000 streams or 10,000 streams) depending on projected demand, by removing/adding streaming servers. On a "global," or system-wide scope, scalability can be achieved by adding new POPs, data centers and even subscribing/allocating higher bandwidth for network connections.

The three-tiered architecture illustrated in FIG. 2 provides for an optimal use of network 210 bandwidth and resources. By transmitting data to end users 250 primarily from edge POPs 240–245, long-haul connectivity (e.g., serving users 250 directly from the content source) is reduced, thereby conserving network bandwidth. This feature is particularly useful for applications such as real-time multimedia streaming which require significant bandwidth and storage capacity. As a result, end users experience a significantly improved quality of service as content delivery from edge POPs 240–245 avoids the major bottlenecks in today's networks.

Figure 4:
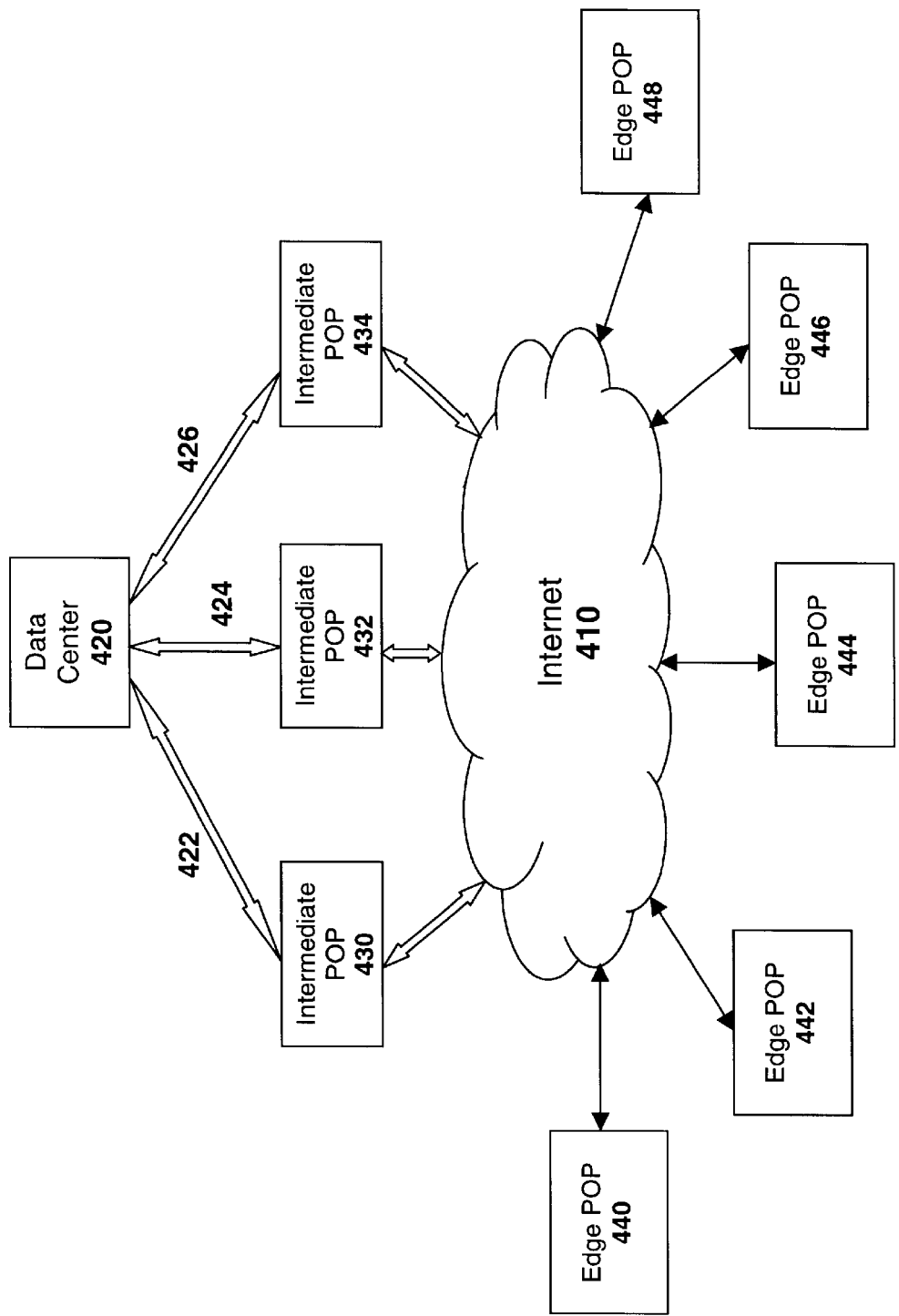
FIG. 4 illustrates another embodiment of a network architecture including elements of the invention.

In one particular embodiment of the system, illustrated in FIG. 4, private, high-speed communication channels 422, 424, and 426 are provided between the data centers 420 and the intermediate POPs 430, 432, and 434, all of which may be owned by the same organization. By contrast, the edge POPs 440–448 in this embodiment are connected to the intermediate POPs 430, 432, 434 and data centers 420 over the Internet (i.e., over public communication channels).

Figure 14:
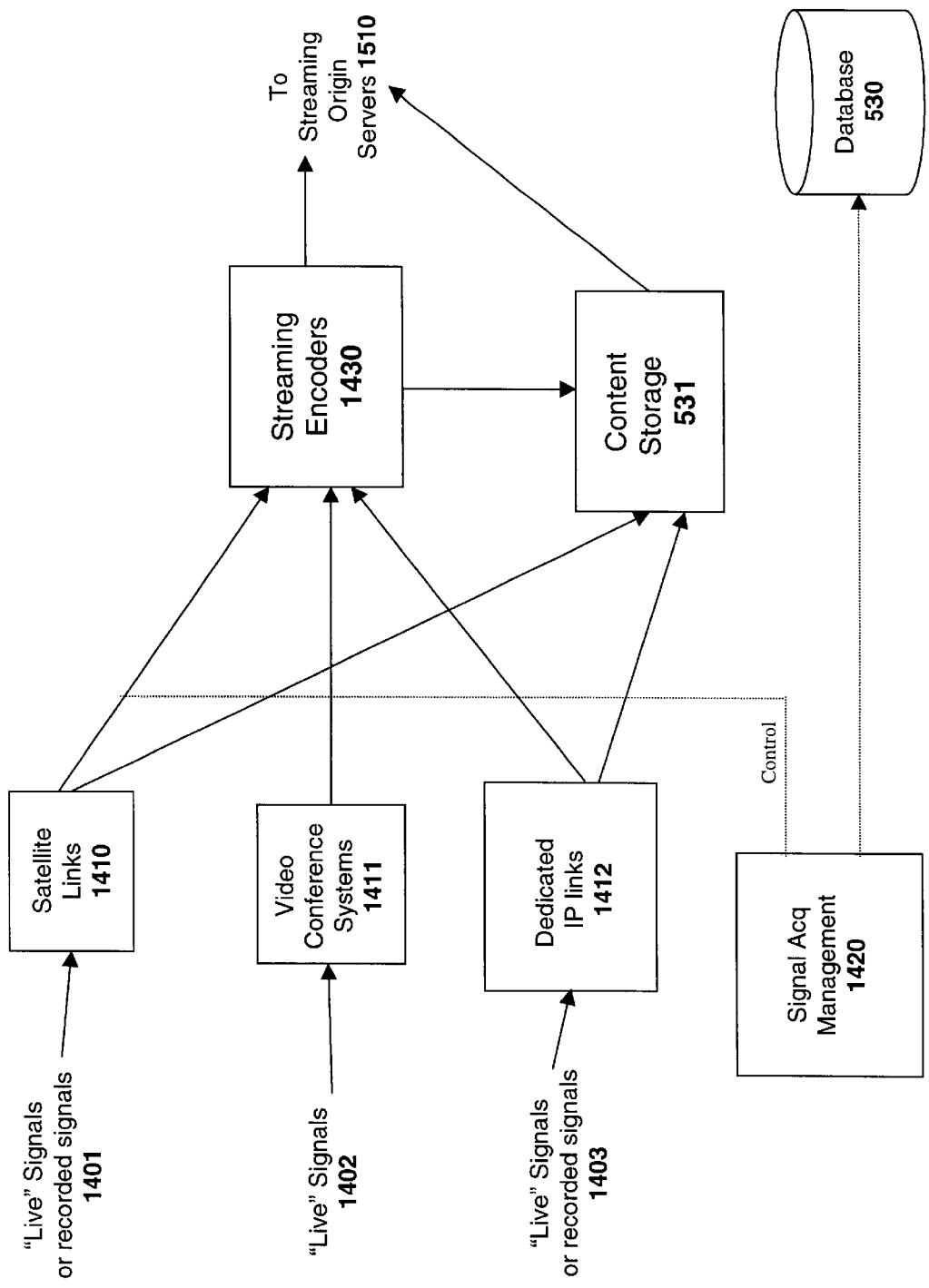
FIG. 14 illustrates one embodiment of the invention configured to process live and/or on-demand audio/video signals.

One particular embodiment of the system configured to stream live and on-demand audio/video content will now be described with respect to FIGS. 14 through 16. As shown in FIG. 14, this embodiment is capable of receiving incoming audio/video content from a variety of sources including, but not limited to, live or recorded signals 1401 broadcast over satellite links 1410; live signals 1402 provided via video conferencing systems 1411; and/or live or recorded signals 1403 transmitted over dedicated Internet Protocol ("IP") links 1412. It should be noted, however, that an unlimited variety of network protocols other than IP may be used while still complying with the underlying principles of the invention. In one embodiment, each of the modules illustrated in FIG. 14 reside at a data center 220.

One or more system acquisition and management modules ("SAMs") 1420 opens and closes communication sessions between the various sources 1401–1403 as required. For example, when a content provider wants to establish a new live streaming session, the SAM 1420 will open a new connection to handle the incoming audio/video data (after determining that the content provider has the right to establish the connection).

The SAM module 1420 will handle incoming signals differently based on whether the signals have already been encoded (e.g., by the content providers) and/or based on whether the signals are comprised of "live" or "on demand" content. For example, if a signal has not already been encoded by a content provider (e.g., the signal may be received at the data center 220 in an analog format or in a non-streaming digital format), the SAM module will direct the signal to one or more streaming encoder modules 1430, which will encode the stream in a specified digital streaming format (e.g., Windows Media,™ Real G2™ etc).

If the incoming signal is live, the streaming encoders 1430 transmit the resulting encoded signal directly to one or more streaming origin servers 1510 (which distribute the signal to various POP nodes as described below) and/or to one or more content storage devices 531 at the data center 220. If, however, the incoming signal is an on-demand signal, then the streaming encoders 1430 transmit the encoded signal directly to the content storage devices 531. Similarly, if the incoming signal is already encoded in a streaming format, it may be transmitted directly to the content storage devices 531, from which it may subsequently be transmitted to the streaming origin servers 1510. As new audio/video streaming content is added to the content storage devices 531, the SAM module 1420 causes the storage database 530 to be updated accordingly (e.g., via the content delivery subsystem described below).

Figure 15:
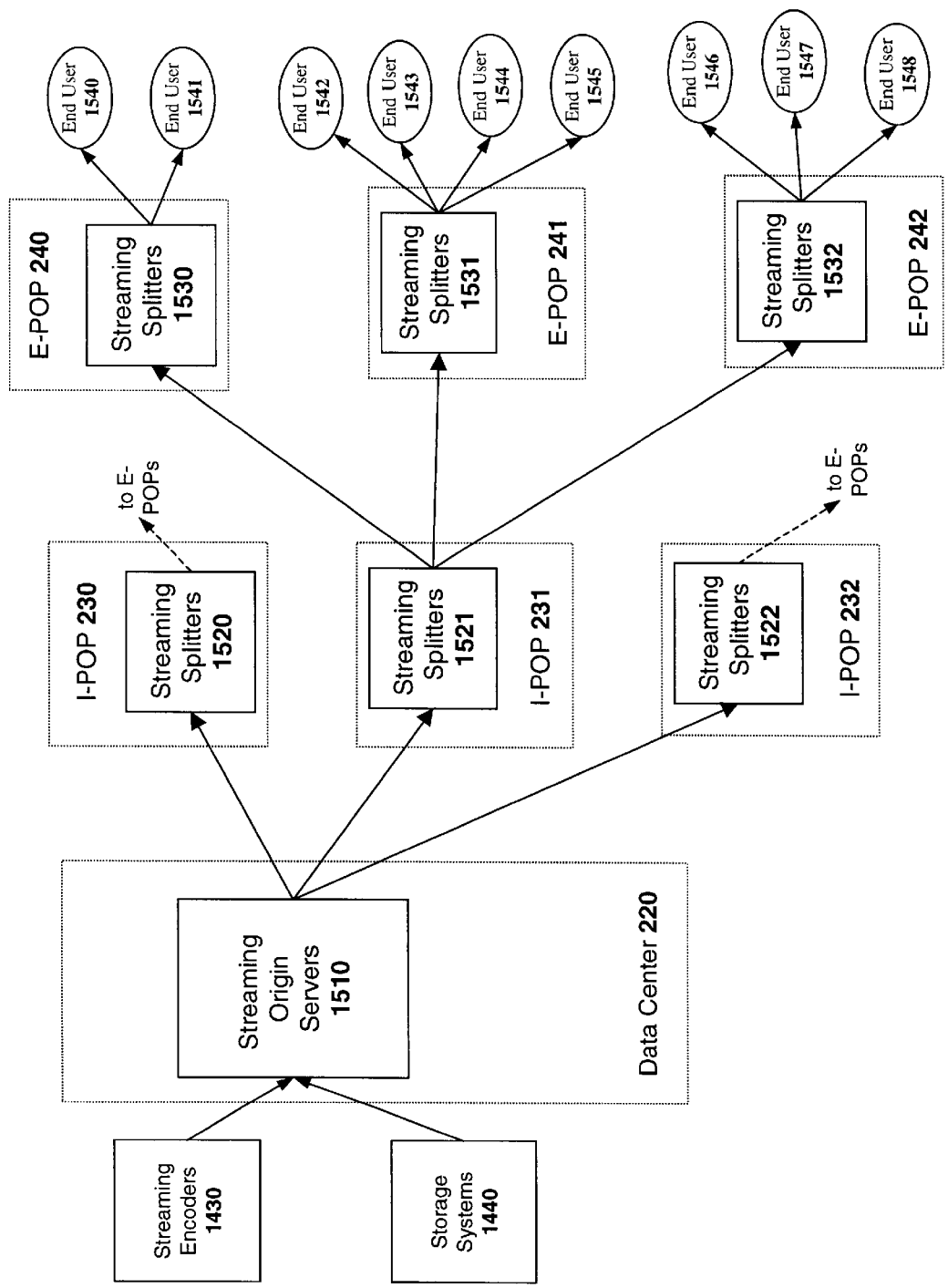
FIG. 15 illustrates one embodiment in which audio/video is streamed across a network to end users.

As illustrated in FIG. 15, the encoded signal is transmitted from the streaming origin servers 1510 to streaming splitters 1520–1522, 1530–1532 located at a variety of I-POP nodes 230–232 and E-POP nodes 240–242. Employing streaming splitters as illustrated conserves a substantial amount of network bandwidth. For example, in the illustrated embodiment each streaming splitter receives only a single stream of live audio/video content from an upstream server, which it then divides into several independent streams. Thus, the network path between an upstream server and a streaming splitter is only loaded with a single audio/video stream.

In addition, employing streaming splitters within the multi-tiered hierarchy, as illustrated, reduces bandwidth at each level in the hierarchy. For example, a single stream from a live streaming event may be transmitted from a streaming origin server 1510 to an I-POP streaming splitter 1521. The streaming splitter 1521 may then transmit a single stream to each of the E-POP streaming splitters 1530–1532, which may then transmit the live event to a plurality of end users 1540–1548. Accordingly, the network path between the data center 220 and the I-POP 231 is loaded with only a single stream and each of the three network paths between the I-POP 231 and the E-POPs 240–242 are loaded with only a single stream. The incoming streams are then split at each of the E-POPs 240–242 to provide the live event to a plurality of end users 1540–1548.

Automated Content Delivery

Figure 5:
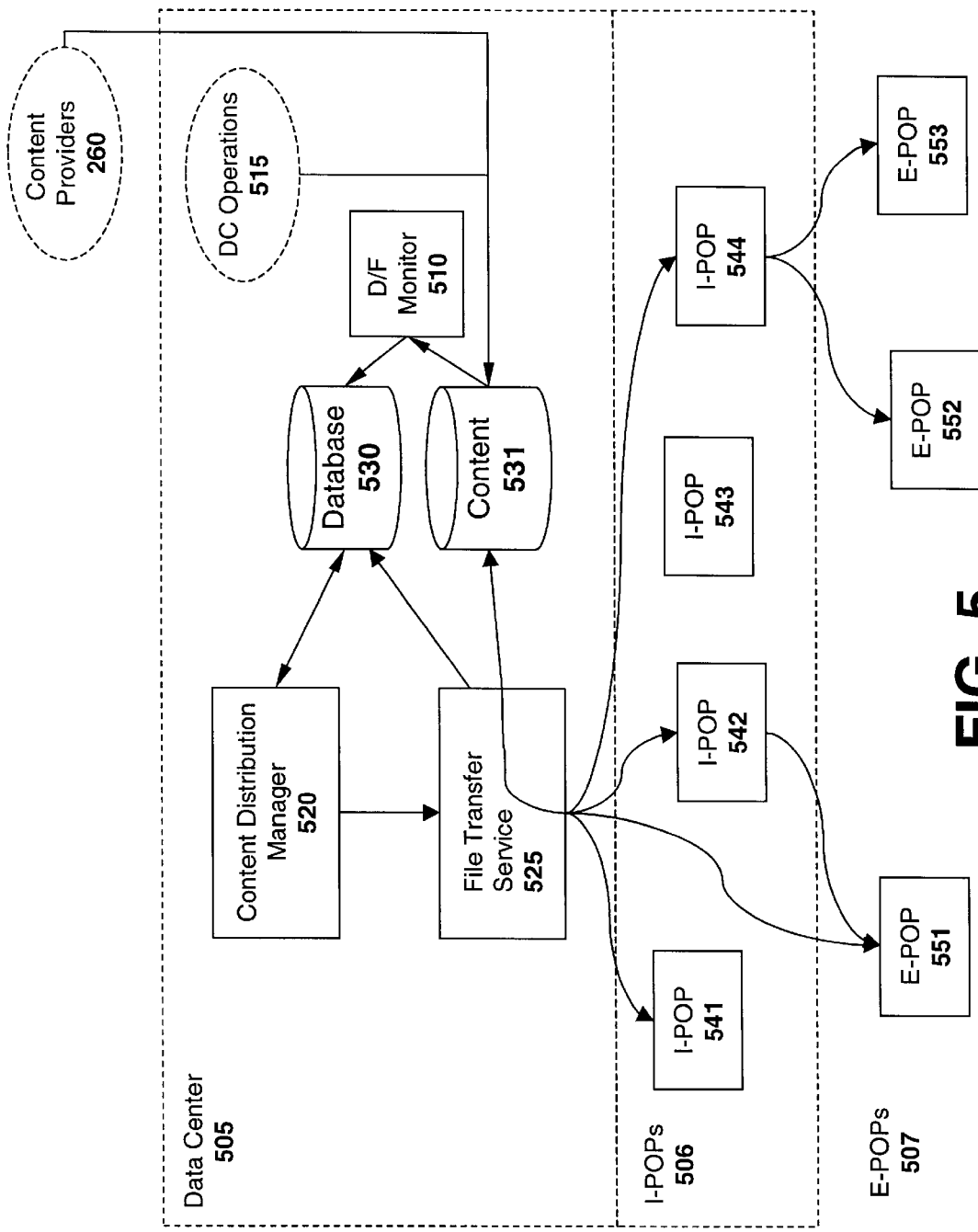
FIG. 5 illustrates one embodiment of the system and method for distributing network content.

As illustrated in FIG. 5, content may be introduced to the system at the data centers 505, either through direct upload by a content provider 260 (e.g., using FTP), by the data center operations staff 515 (e.g., via tapes and CD's), or via a live, real-time multimedia signal. Regardless of how the new content is introduced, in one embodiment, a directory/file monitor module ("DF Mon") 510 updates a content database 530 to identify the new files that have arrived at the data center 505. A database field or a tag may be set to indicate that the files are new and have not yet been transmitted to the intermediate POPs 506. In one embodiment, DF Mon 510 is a service running in the background on a server at the data center (e.g., a Windows NT® service) which uses operating system primitives (e.g., Win32) to monitor encoded file directories. The operating system notifies DF Mon 510 when files are added or removed from these directories.

An automatic content distribution subsystem then automatically distributes (i.e., "replicates" or "mirrors") the newly introduced content throughout the system. In one embodiment, the automatic content distribution subsystem is comprised of a content distribution manager ("CDM") module 520, and a file transfer service ("FTS") module 525. The CDM 520 implements content distribution and management policy, and FTS 525 handles the physical transfer of files. It should be noted that, although FIG. 5 illustrates FTS 525 and CDM 520 residing entirely at the data center 505, instances of these modules may be implemented on other nodes within the network (e.g., intermediate POPs 541–544).

In one embodiment, a central database 530 maintained at one of the data centers 220–221 is used to track content as it is distributed/replicated across the network 210. CDM 520 queries the database 530 periodically to determine whether any files (stored on the content storage device 531) should be replicated at intermediate POPs 506. Alternatively, or in addition, CDM 520 may be notified (e.g., asynchronously by a database application programming interface, by DF Mon 510, or some other event-driven module) when a file, of group of files, need to be replicated.

Once CDM 520 determines that files need to be replicated, it sends a command to the FTS, referred to herein as a "File Request Message" ("FRM") to the FTS 525, identifying the files and the destination POPs 506, 507 for the file transfer. The FTS 525 then carries out the underlying file transfer process (e.g., by invoking Win32 or FTP commands; the latter for transfers over the Internet), and provides database updates indicating whether the transfer was successful and where the file was copied.

The file removal process works in a similar manner. CDM 520 queries the database 530 for files marked "to be deleted" ("TBD"). Alternatively, or in addition, CDM 520 may be notified (as with file transmittal) when files are marked TBD. A file can be marked TBD in a variety of ways. For example, when a content provider 260 uploads the file, the provider 260 may indicate that it only wants the file to be available for a specified period of time (e.g., 10 days). Alternatively, the content provider 260 may not specify a date for deletion, but may instead manually mark the file TBD (or may have the data center operations staff 515 mark the file) at any time. In another embodiment, the content provider 260 indicates that the file should be marked TBD based on how frequently (or infrequently) users 250 request it.

Once a file has been copied to or deleted from a POP node 506, 507, the content distribution subsystem creates or removes a "FileLocation" database record in the central content database 530. This record provides the association between a data center file and its copies on storage servers at intermediate and/or edge sites.

Figure 6:
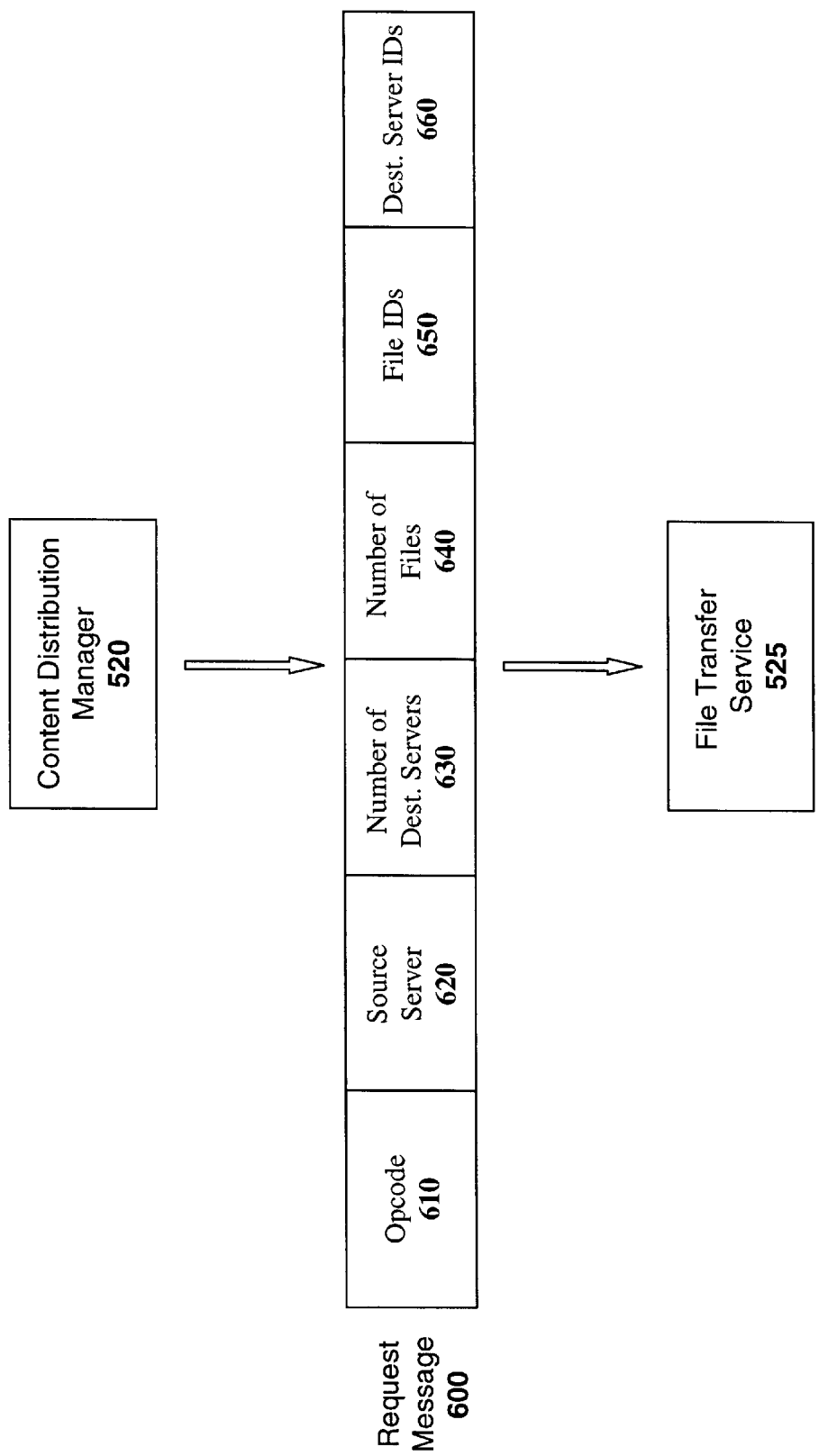
FIG. 6 illustrates a file Request Message according to one embodiment of the invention.

One embodiment of a FRM data structure 600 is illustrated in FIG. 6. The structure 600 includes an opcode 610 which identifies to the FTS the operation which needs to be performed on the file(s), including an identification of whether a "file delete" or a "file transfer" is needed, and an indication as to the particular type of file delete/transfer. For example, depending on the circumstances, either an FTP delete/transfer or a Win32 delete/transfer (or alternate type of delete/transfer) may be appropriate (e.g., FTP is more appropriate if the delete/transfer occurs over the Internet whereas a Win32 delete transfer may be more efficient over a private channel).

In addition, the opcode field 610 may specify either a normal delete/transfer or a "lazy" delete/transfer. Basically, "lazy" FTS commands may be used to handle low priority transfers/deletes. In one embodiment a "lazy" command will process the delete and transfer requests using only a single thread (i.e., a single transaction or message in a multi-threaded system), whereas "normal" operations may be performed using multiple threads. Single thread, "lazy" operations may be implemented for certain types of FTP commands (e.g., those based on the WS_FTP API).

A source server field 620 identifies the server at the data center from which the file originated; a "number of destination servers" field 630 indicates the number of POPs to which the file will be transferred/deleted; a "number of files" field 640 indicates how many files are involved in the transaction; an "actual file ID" field 650 identifies each of the files involved in the transaction; and one or more "actual destination server IDs" specify the actual destination servers to which the file(s) will be copied/deleted. In this embodiment, the "number of files" field 640 and the "number of destination servers" field 630 may be used by the system to determine Request Message packet length (i.e., these fields identify how large the actual file ID and destination server ID fields, 650, 660 need to be).

It should be noted that the foregoing description of the Request Message format 600 is for the purpose of illustration only. Various other types of information/data formats may be transmitted between the CDM 520 and the FTS 525 consistent with the underlying principles of the invention.

In one embodiment, the CDM 520 may replicate content at specified intermediate POPs 541–544 (and in some cases edge POPs 551–553) in different ways depending on variables such as network congestion (a.k.a., "load"), the demand for certain files at certain locations, and/or the level of service subscribed to by content provider(s) 260. For example, during periods of high network congestion, the CDM 520 may store file Request Messages in a queue on the database 530. Once network congestion drops below a predetermined threshold value, the Request Messages from the queue are then transmitted to the FTS 525, which performs the file transfer/file deletion process.

Similarly, if it is known ahead of time that a particular file will be in extremely high demand at a particular time (e.g., the "Starr Report"); and/or will otherwise require a substantial amount of network bandwidth (e.g., high-quality streaming video files), then the CDM 520 may be programmed to transmit the file(s) to certain intermediate POPs 541–544 (and/or edge POPs 551–553; see below) beforehand to avoid significant quality of service problems (e.g., network crashes).

The CDM 520 may also push files to POPs 541–544 based on the level of service subscribed to by each content provider 260. For example, certain content providers 260 may be willing to pay extra to have a particular file readily available at all POPs 541–544; 551–553 on the network at all times. Moreover, content providers 260 may want specific types of content to be available on some POPs 541–544, but not others. An international content provider 260, for example, may want the same underlying Web page to be available in different languages at different intermediate POPs 541–544 sites, depending on the country in which the intermediate POPs 541–544 are maintained (and which therefore supply content to users in that country). Thus, an automobile manufacturer may want a French version of its Web page to be pushed to POPs in France, and a German version to POPs in Germany. The CDM 520 in this embodiment may be configured to transmit the content as required to meet the specific needs of each content provider 260. In one embodiment, the CDM 520 determines where specified files need to be copied based on the manner which the files are marked in the database 530 (e.g., the files may indicate a valid set of POPs on which they should be replicated).

File Caching

In one embodiment, the edge POPs 551–553 are treated as cache fileservers for storing the most frequently requested media content. The CDM in one embodiment caches content at the edge POPs 551–553 using both forced caching and demand-based caching.

Under a forced caching protocol, the CDM identifies files which will be in high demand at particular edge POP sites 551–553 (e.g., by querying the database 530) and responsively pushes the files to those sites. Alternatively, or in addition, a content provider may specify edge POP sites 551–553 where CDM should cache a particular group of files. The ability of a content provider to specify edge POP sites 551–553 for caching files may be based on the level of service subscribed to by the content provider (as described above with respect to intermediate POP sites).

Figure 7:
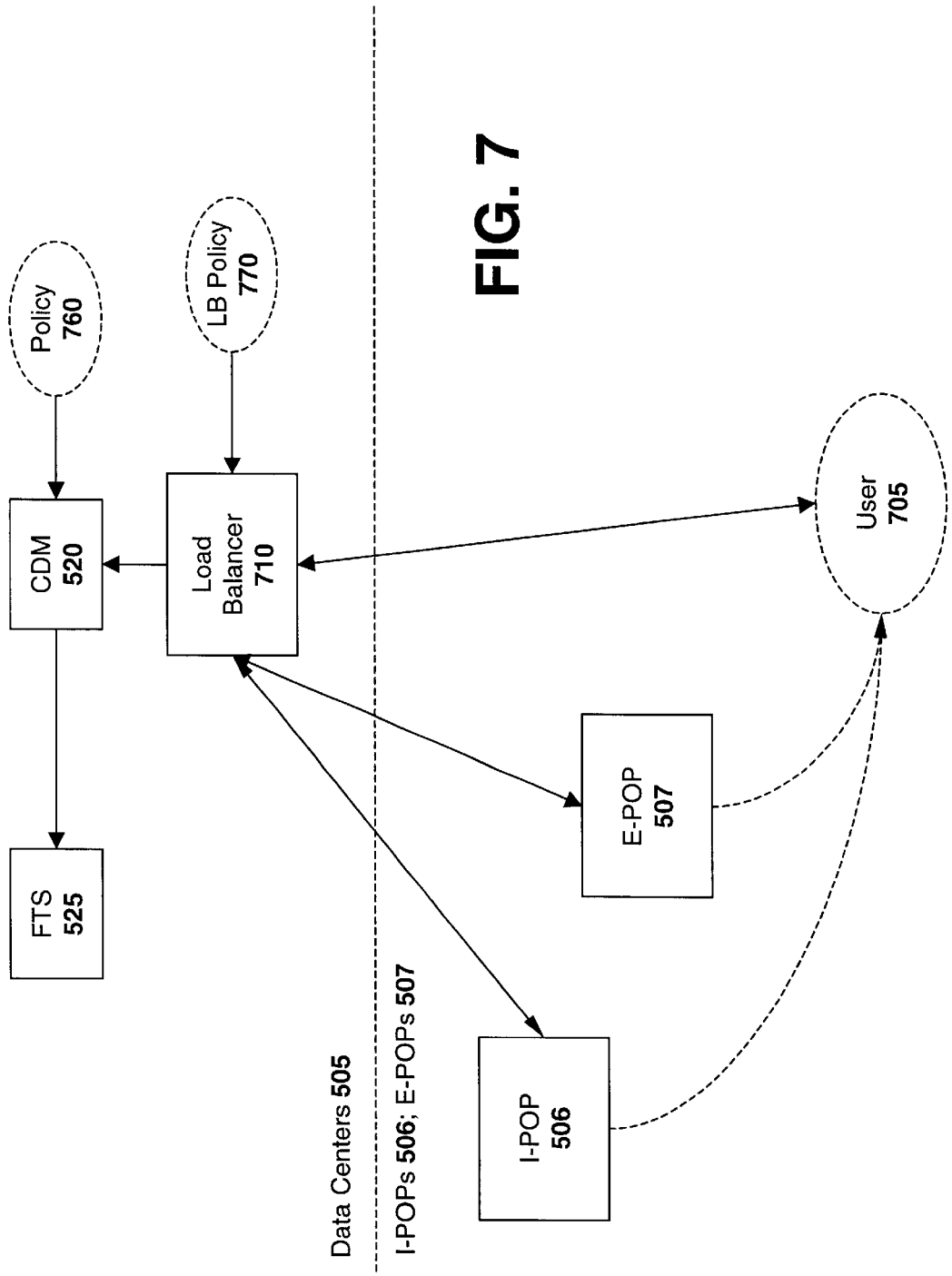
FIG. 7 illustrates embodiments of the invention in which network content is cached at edge POPs.

Embodiments of the system which employ demand-based caching will now be described with respect to FIG. 7. In one embodiment, when a user 705 requests content stored on a particular Internet site (e.g., a Web page, a streaming multimedia file . . . etc), the request is received by a load balancer module ("LBM") 710, which identifies the most appropriate edge POP site 507 to handle the request. The LBM 710 in one embodiment is a module which resides at a data center (e.g., running on a Web server). What the LBM 710 identifies as the "most appropriate" depends on the particular load balancer policy 770 being applied to the LBM 710. The policy 770 may factor in caching/network variables such as the network load, the edge POP 507 server load, the location of the user who requested the content, and/or the location of the edge POP 507 server, to name a few.

In one embodiment, the LBM 710 finds the most appropriate edge POP 507 and determines whether the content is available at the edge POP 507 by querying the central database 530 (i.e., the database 530 in one embodiment keeps track of exactly where content has been distributed throughout the system). If the requested content is available at the edge POP 507, it is transmitted to the user 705. If, however, the content is not available at the edge POP 507, then the LBM 710 redirects the request to the second most appropriate POP, (e.g., intermediate POP 506 in the illustrated embodiment), which then transmits the content to the user 705.

The LBM 710 notifies the CDM 520 that the requested content was not available on edge POP site 507 (i.e., that a cache "miss" occurred). The CDM 520 determines whether the particular edge POP site 507 should cache a copy of the requested content to be available for future user requests. If the CDM determines that a copy should be maintained on the edge POP 507, it sends a transfer Request Message to the FTS 525 which carries out the underlying file transfer to the edge POP 507.

The decision by the CDM 520 as to whether a copy should be cached is based on the particular caching policy 760 being applied. In one embodiment of the system, the caching policy will factor in the number of times a particular file is requested from the edge POP 507 over a period of time. Once a threshold value is reached (e.g., ten requests within an hour) the CDM 520 will cause the FTS 525 to transfer a copy of the file.

Other variables which may be factored in to the caching policy 760 include whether the requested file is non-cacheable (e.g., files requiring user authentication or dynamically changing content), the storage capacity at the edge POP 507, the size of the requested file, the network and/or server congestion, and the level of service subscribed to by a particular content provider 260, to name a few. Any of these variables alone, or in combination, may be used by the CDM 520 to render caching decisions.

Figure 8:
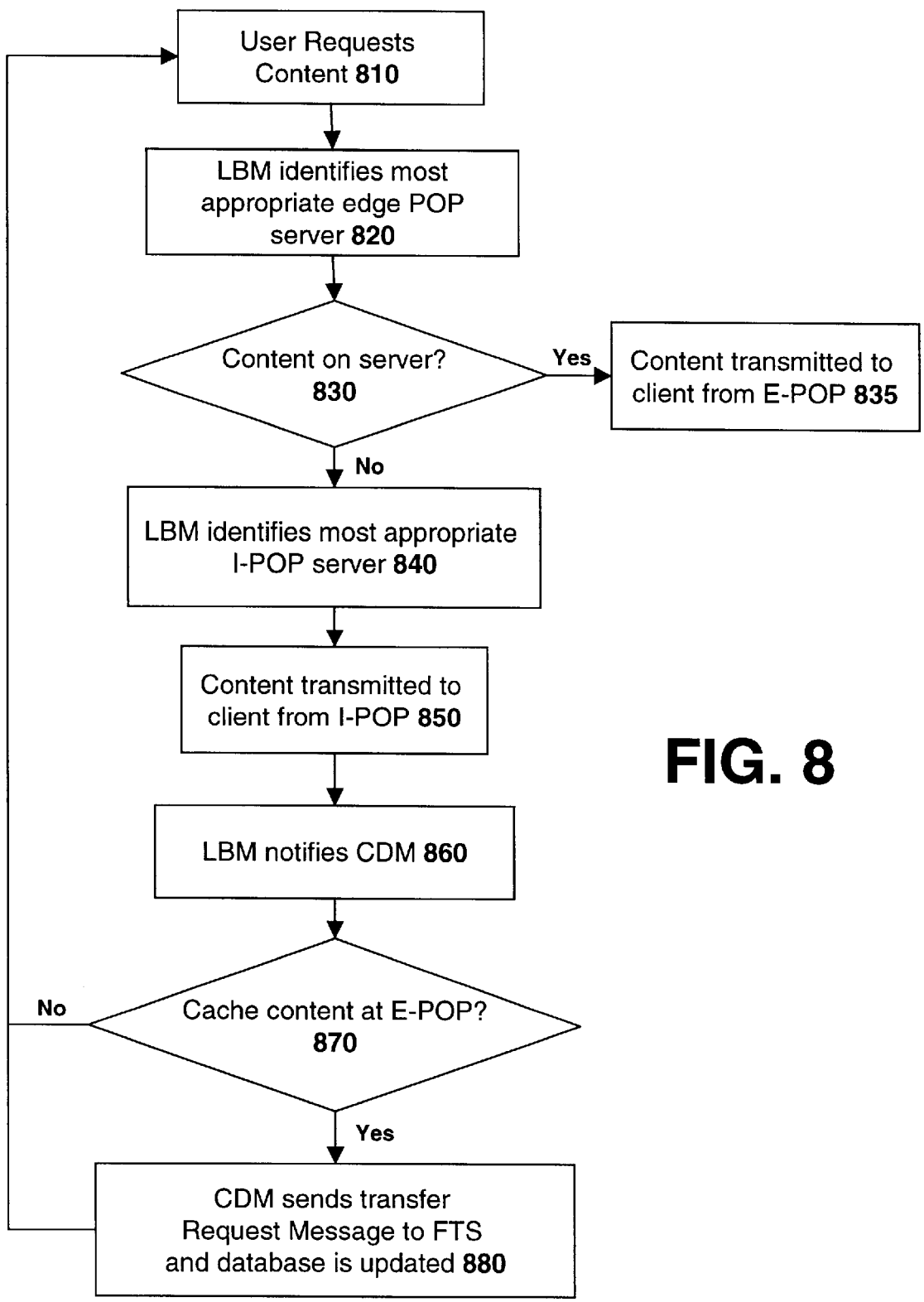
FIG. 8 illustrates one embodiment of a method for caching network content.

One embodiment of a method which employs demand-based caching will now be described with respect to the flowchart in FIG. 8. At 810 a user makes a request for content. In response, an LBM 710 identifies the most appropriate edge POP site from which to transmit the requested content (e.g., by querying a central database at the data center). If the requested content is available at the edge POP server, determined at 830, then the LBM 710 directs the user to the edge POP server (e.g., by transmitting the server's URL to the user) and the content is transmitted to the user at 835.

If, however, the content was not available, then at 840 the LBM identifies the most appropriate intermediate POP server from which to transmit the content (e.g., by querying the database). The intermediate POP server transmits the content to the user at 850 and, at 860, the LBM 710 notifies the CDM 520. The CDM at 870 determines whether a copy of the requested content should be stored locally at the edge POP site based on the particular caching policy being implemented. If the decision is to cache content at the edge POP site then the content is transferred to the edge POP site and the database is updated accordingly at 880.

Figure 16:
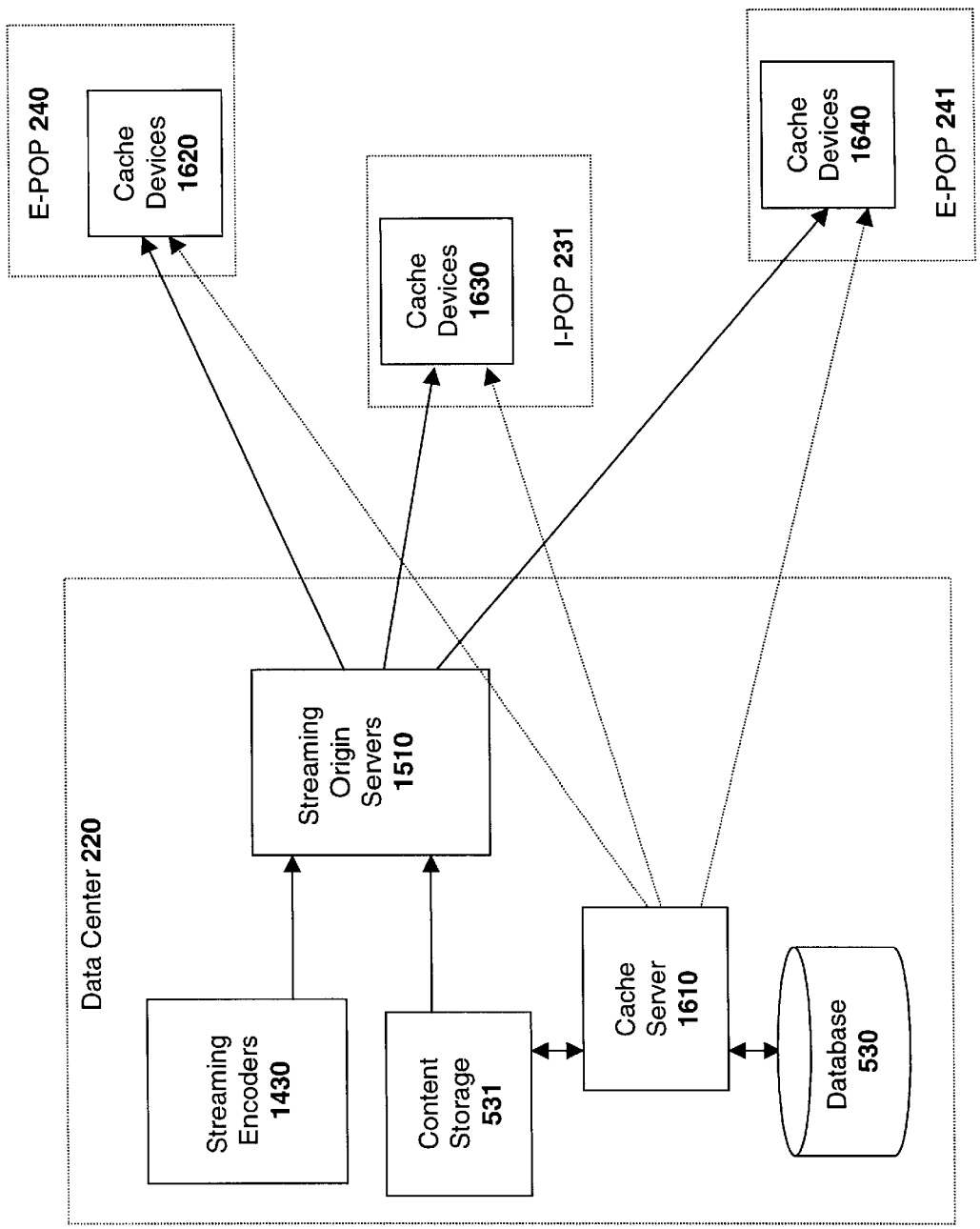
FIG. 16 illustrates one embodiment in which audio/video streaming content is cached at one or more POP sites.

As illustrated in FIG. 16, one embodiment provides a mechanism for caching frequently requested streaming content at I-POPs 231 and/or E-POPs. Whether to cache a particular audio/video streaming file may be based on anticipated and/or actual demand for the file. For example, if a particular file has been requested a certain number of times at one E-POP 241 within a predetermined time period (e.g., ten times within an hour), then the file may be transmitted from a cache server 1610 (which receives a subset of files from the content storage devices 531) at the data center 220 to a local cache device 1640 at the E-POP 241. In one embodiment, when files are cached or deleted from one or more of the POP sites, the database 530 is updated to reflect the changes.

Figure 13:
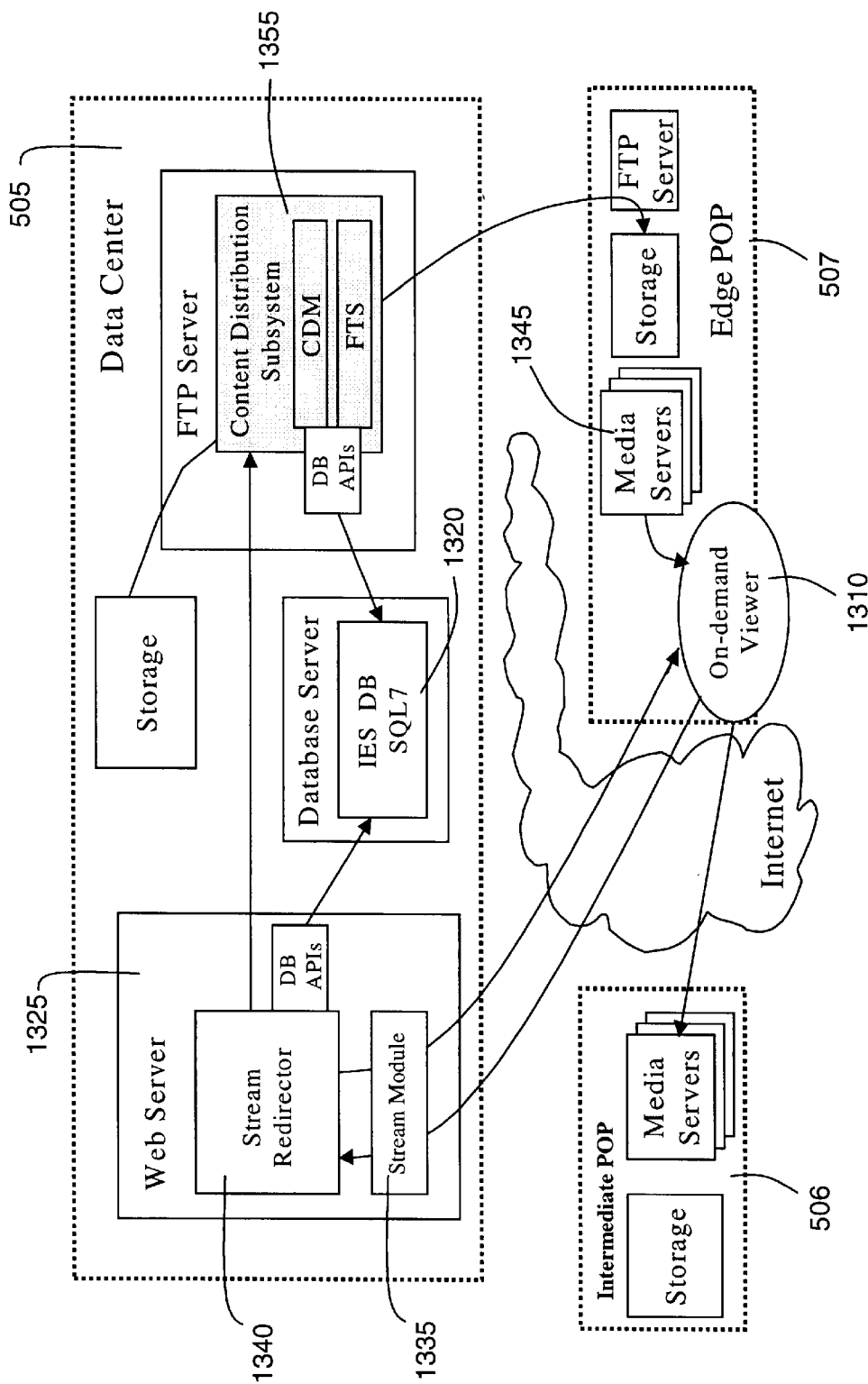
FIG. 13 illustrates an embodiment of the invention in which a streaming media file is cached at an edge POP.

One particular embodiment of the system and method for distributing and streaming multimedia files will now be described with respect to FIG. 13. A viewer 1310 connected to the Internet through an edge POP 507 in this example, makes a request to stream an on-demand file. The file is referenced in the IES database 1320 by a "FileInfo" record with the ID to the record embedded as a parameter in the URL the viewer clicked on to access a Web server 1325 at the data center 505. The web server 1325 in this embodiment brings up a streaming module (e.g., a Web page; "stream.asp" for Windows 98™) 1335 to process the request. The streaming module 1335 builds a metafile (e.g., a Real G2 RAM or WMT ASX metafile) that includes the streaming server path to the desired file. The streaming module 1335 calls the Stream Redirector 1340 to determine this path. It passes in the Fileinfo ID from the URL and the viewer's IP address.

The Stream Redirector 1340 in one embodiment is an out-of-proc COM server running on the Web server 1325. When called by the streaming module 1335 to create the streaming server path to the on-demand file, the redirector 1340 first checks the viewer's 1310 IP address against a list of site IP masks collected earlier from the database 1320. In the illustrated embodiment, the redirector 1340 finds a match and correctly identifies the edge POP site 507 the viewer 1310 is connecting from. It checks the database 1320 (e.g., using database API's) to determine if the desired file exists at the viewer's edge POP site 507. If it finds a FileLocation record matching this site 507 using the FileInfo ID from the URL, it returns a streaming path that redirects the viewer to a media server 1345 co-located at the edge POP site 507. If it doesn't find the file there (i.e., resulting in a cache "miss"), it instead generates a path redirecting the viewer to one of the intermediate POP sites 506 where the file is known to be located.

The redirector 1340 requests that the content distribution subsystem 1355 transmit a copy of the file to the edge POP site 507 after returning the intermediate POP 506 path to the streaming module 1335. Alternatively, in one embodiment, the redirector 1340 simply notifies the content distribution subsystem 1355 that requested content was not present at the edge POP site 507, and allows the content distribution subsystem 1355 to make the final decision as to whether a copy should be stored at the edge site 507 (e.g., based on the content distribution policy). CDM then forwards the request to FTS where the job is queued for later processing.

The redirector 1340 returns the intermediate POP redirection path to the streaming module 1335 where it is inserted into the metafile and returned to the viewer's 1310 browser. The viewer's 1310 browser receives the metafile and hands it over to the streaming player (e.g., RealPlayer ®, Windows MediaPlayer®. . . etc). The player parses the metafile for the redirection path, establishes a connection to a media server at the designated intermediate POP 506 and begins streaming the on-demand file.

The FTS processes the job for transferring the file to the edge POP site 507 (e.g., via a Win32 file copy if a private connection to the site exists or, alternatively, via FTP over the Internet if that represents the only path to the site from the data center). The FTS in one embodiment may run on any server within the network. Thus, instances of FTS could reside at the intermediate POPs 506 and initiate copies from intermediate POPs 506 to edge POPs 507 thus preserving bandwidth on the private connections running out of the data center 505. When the file copy to edge POP 507 storage completes successfully, FTS creates a "FileLocation" database record associating the FileInfo and edge POP site 507 records.

The next time this viewer 1310 or another viewer connecting through this edge POP 507 attempts to stream the same file it will be streamed directly from a media server 1345 (e.g., attached to an ISP's LAN) at the edge POP site 507. The FileLocation database record created allows the redirector 1340 to select the more optimal ISP site for serving the viewer 1310. It should be noted that timings among the various components can vary depending on demand of the system, but general concepts still apply.

Storage Space Management

Referring again to FIG. 5, in one embodiment, the CDM 520 implements a policy to manage cache space on all edge file servers using file access data stored in the central database 530 (e.g., data indicating when and how often a particular file is requested at an edge POP). Files requested relatively infrequently, and/or files which have not been requested for a relatively long period of time when compared with other files may be marked TBD from the edge POP (i.e., via "least frequently used" and "last access time" algorithms, respectively). File expiration dates may also be included in the database (e.g., "File X to expire after 1/15/00") and used by the CDM 520 to perform cache management functions.

In one embodiment, each edge POP 551–553 is associated with high and low threshold values stored in the database 530. The high threshold value is a percentage which indicates how full an edge server storage device must be for the CDM 520 to invoke file removal operations. The low threshold value is a percentage which indicates how full the edge server storage device will be when the CDM completes its file removal functions.

For example, if the high threshold for a particular edge POP 551 is 80%, a high threshold flag will be set on the database 530 when the storage at that site reaches 80% of its capacity. In response, the CDM 520, which queries the database 530 periodically for threshold data, will order the FTS 525 to remove files from the site using one or more of the cache management policies described above. If the low threshold is set at 60% for the site, then the CDM 520 will order the FTS 525 to delete files until the site storage has reached 60% of its capacity. Setting a low threshold in this manner prevents the file removal operation from running perpetually once a file server reaches it's high threshold value.

Fault Tolerance

Figure 9:
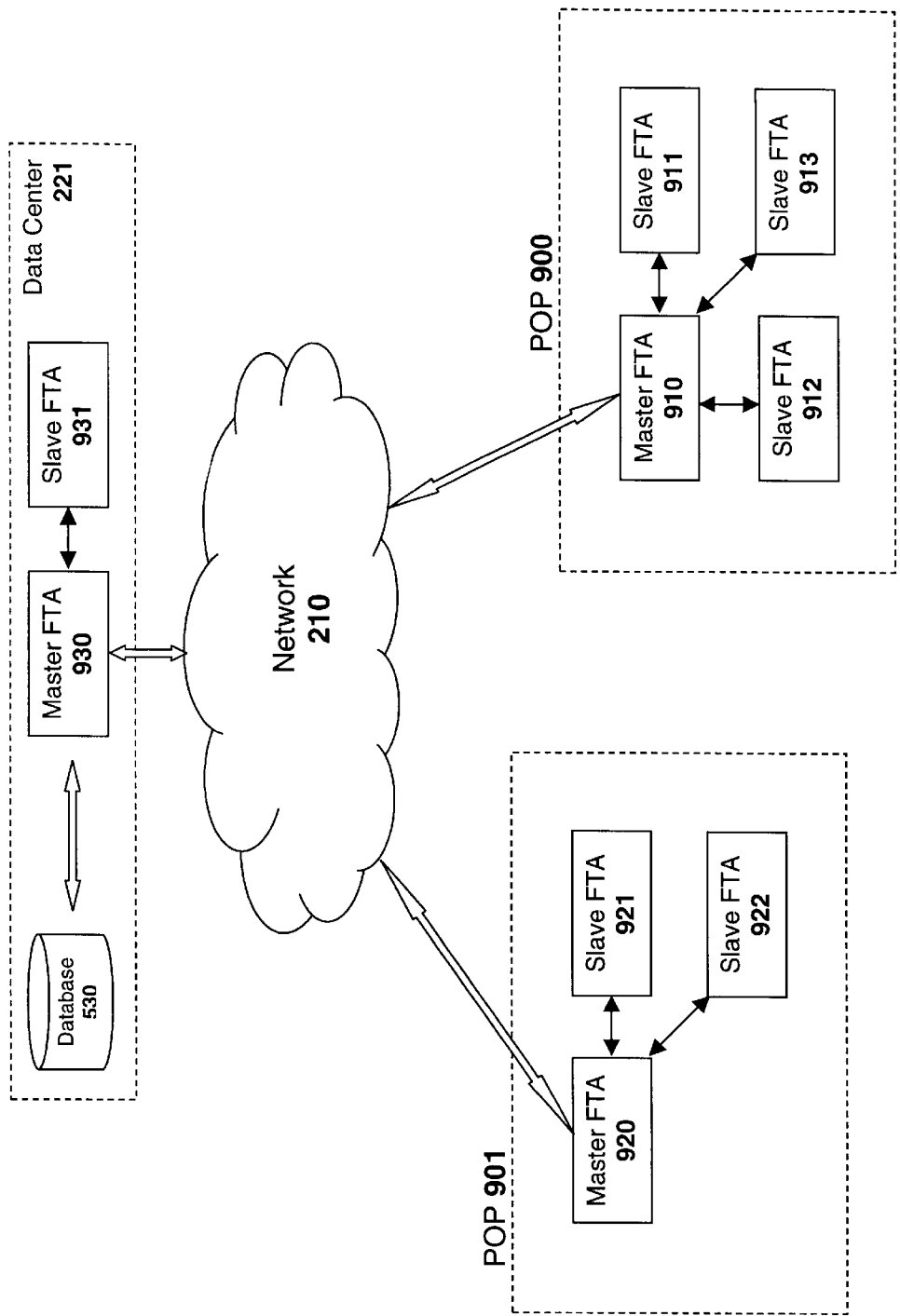
FIG. 9 illustrates one embodiment of the invention which includes fault-tolerant features.

One embodiment of the system which employs fault tolerant capabilities will now be described with respect to FIG. 9. Previously, if more than one fileserver existed at a given POP, content was transferred from the content source to each individual fileserver at the POP site. Transferring multiple copies of the same file in this manner tends to be inefficient and costly, particularly with respect to multimedia files (which are generally quite large). Maintaining a single fileserver at each site solves the problem of increased network and server traffic, but creates a reliability problem (i.e., if the fileserver goes down, the entire site will be unavailable).

One embodiment of the invention solves all of the foregoing problems by providing backup fileservers 911–913, 921–922, and 931 which are activated in the absence of the primary servers 910, 920, and 930, respectively. A module referred to as a File Transfer Agent (hereinafter "FTA") runs on all fileservers 910–913, 920–922, and 930–931 at the various sites and may be configured as either a master FTA or a slave FTA. The master FTA fileservers 910, 920 and 930 transmit and receive files from the rest of the system (e.g., from the data center 221 over network 210), whereas the slave FTA fileservers 911–913, 921–922, and 931 only receive files from the master FTA fileservers 910, 920, and 930, respectively.

Master/slave FTA assignments in each fileserver cluster are configured manually and/or are negotiated through a protocol. Information identifying each master and slave FTA at each of the POPs 900, 901 and data center 221 is stored in the database 530. When a file is to be transferred to a particular site 900 (e.g., via an FTS file transfer command), a master FTA 930 at the data center 221 looks up the master FTA fileserver 910 at that site (e.g., via a database 530 query). The source master FTA fileserver 930 at the data center 221 transfers the file to the destination master FTA fileserver 910 at the POP site 900. The destination master FTA 910 is then responsible for transferring the content to the remaining fileservers 911–913 within the cluster. In one embodiment, the FTA comprises a portion of the content delivery subsystem (i.e., CDM/FTS) described herein.

Similarly, when files are deleted from the master FTA fileserver 910, the master FTA is responsible for deleting files from the slave fileservers 911–913. In this manner, any changes to the master FTA fileserver 910 are reflected to other secondary fileservers 911–912 in the cluster. In one embodiment, this synchronization is accomplished using a daemon that detects any changes on the master FTA fileserver, and then automatically updates the other fileservers.

If the master FTA fileserver 910 goes down, one of the slave FTA fileservers (e.g., 911) within the fileserver cluster becomes the master FTA through protocol negotiation. In one embodiment, a keep-alive protocol is implemented wherein one or more of the slave FTA fileservers 911–913 periodically sends status requests to the master FTA fileserver 910 to ensure that the master is active. If a response is not received from the master FTA after a predetermined number of requests (indicating that the master is down) then one of the slave FTA fileservers 911–912 becomes the new master FTA. In one embodiment, automatic master/slave assignments are accomplished randomly; each FTA generates a random number and the FTA with the largest random number is assigned to be the new master.

Error Handling and Recovery

Figure 10:
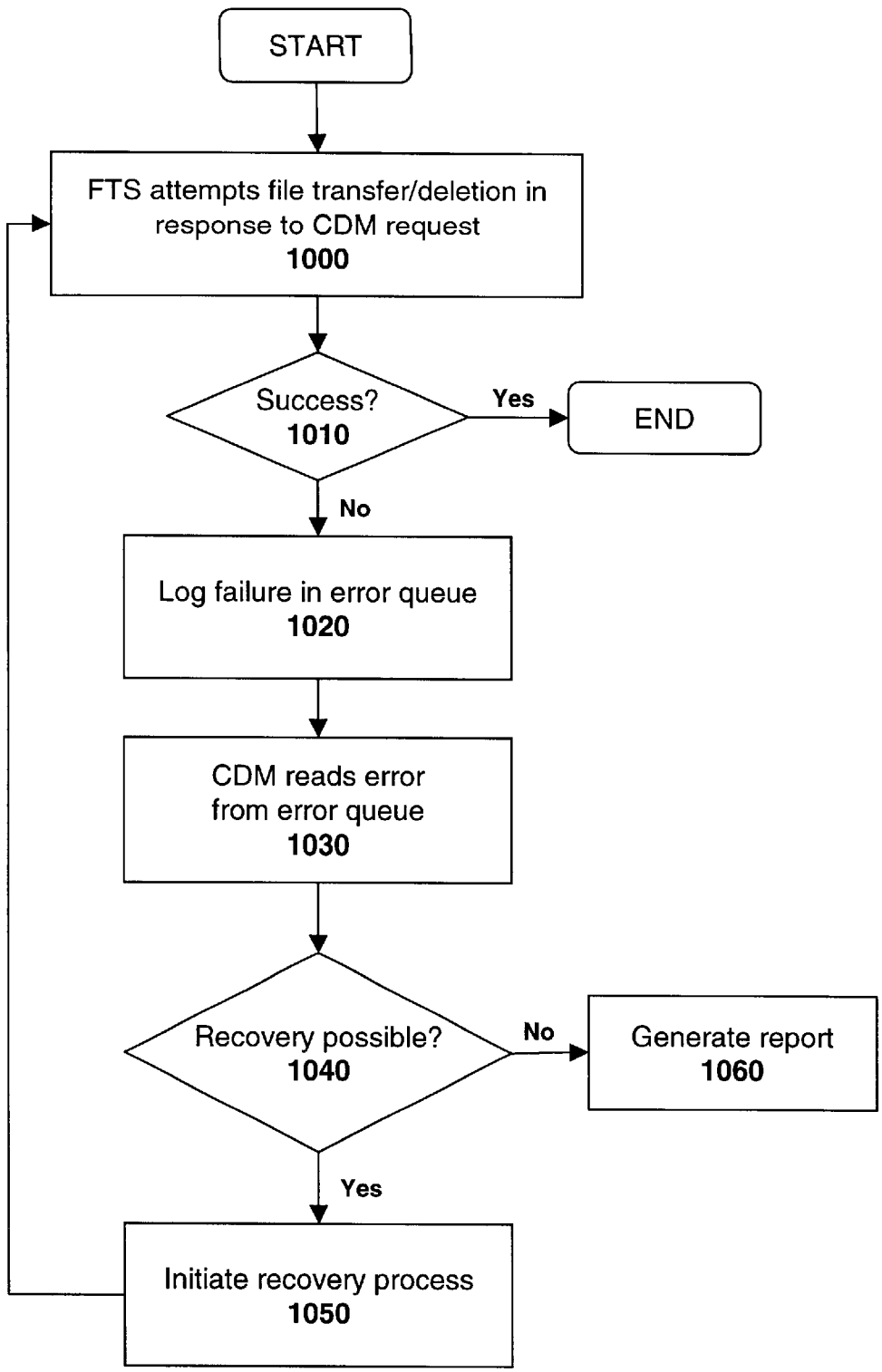
FIGS. 10 and 11 illustrate embodiments of the invention which include error detection and recovery features.
Figure 11:
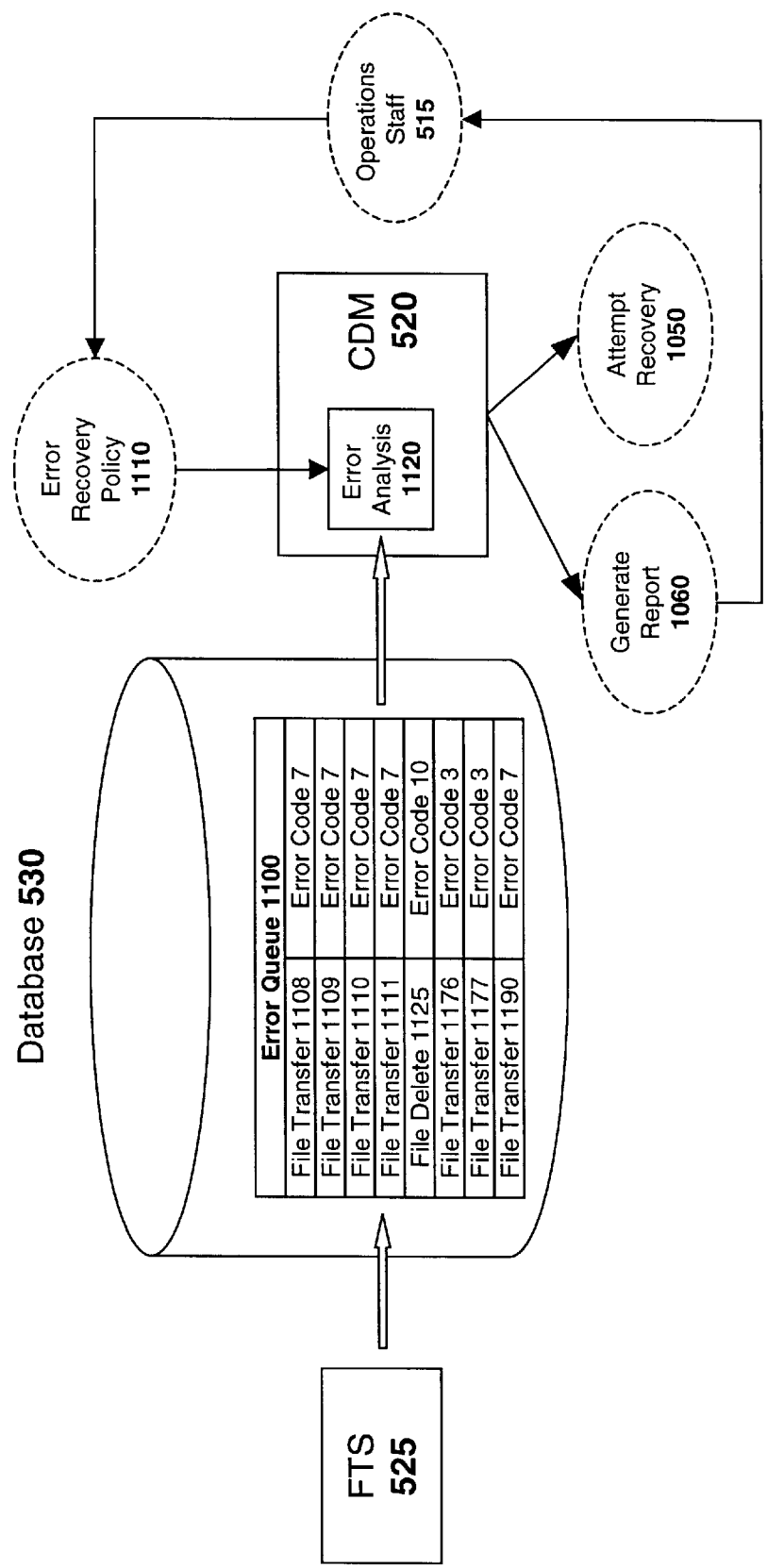

Potentially thousands of files per day are processed by the CDM 520. As such, a robust, automated error handling and recovery design would be beneficial to ensure a high quality of service for end users 250. A network failure may have a number of potential causes, including, for example, unavailability of the source or destination site (e.g., because servers are down), extreme network congestion, unavailability of network communication channels, and various types of software errors. In one embodiment of the system, which will now be described with respect to FIGS. 10 and 11, CDM automatically detects, analyzes and attempts to correct network failures.

At 1000 (FIG. 10), the FTS 525, in response to a CDM 520 Request Message, attempts to perform a file operation (e.g., a file transfer and/or a file delete). If the operation is successful (determined at 1010), then the FTS 525 updates the database 530 to reflect the changes, and moves on to the next file operation to be performed. If, however, the FTS 525 is unable to carry out the requested operation, it then logs the error in an error queue 1100 on the database 530 (at 1020). Each entry in the error queue 1100 includes the Request Message operation which resulted in the failure (e.g., file transfers 1108–1111, 1176–1177, 1190; and file delete 1125 in FIG. 11), along with an error code indicating the reason for the failure (e.g., error codes 7, 10 and 3 in FIG. 11).

An error analysis portion of CDM 1120 queries the database 530 for errors periodically (at 1030), and determines an appropriate error recovery procedure which is based a recovery policy 1110. The recovery policy 1110 may include both network-specific and general procedures provided by the data center operations staff 515 (see FIG. 5). For example, if a destination POP was down for a known period of time (e.g., from 8:00 to 11:00 PM) the operations staff 515 may include this network-specific information in the recovery policy 1110. When the CDM 520 receives file operation errors directed to this POP during the specified period of time, it will recognize that these errors are recoverable errors at 1040 (i.e., assuming the destination. POP is no longer down), and will initiate an error recovery process 1050 (e.g., it may direct the FTS 525 to reattempt the file transfer operation).

The recovery policy 1110 may also include general recovery procedures. For example, if the failed file operation has only been attempted once by the FTS 525, the CDM 520 may automatically direct the FTS 525 to try again (i.e., assuming that the failure was the result of a temporary network glitch). If the failures persist after a predetermined number of attempts, the CDM 520 may determine that recovery is not possible and generate a report (at 1060) to be reviewed by the operations staff 515.

In one embodiment, the CDM 520 determines whether to attempt recovery 1050 based on the particular type of error which occurred and/or the number of previous attempts. For example, if the error was due to the fact that the file was not available at the data center 221, then the CDM 520 may recognize immediately that recovery is not possible, and will generate a report 1060 indicating as much. If, however, the error was due to network congestion, then the CDM 520 may make several attempts to correct the error (i.e., it may direct the FTS 525 to make several attempts at the file operation) before determining that recovery is not possible and generating a report 1060.

The CDM 520 may also recognize recoverable errors based on the successive number of a particular type of error directed to the same POP over a period of time. For example, if successive file transfer operations directed to a particular POP (e.g., file transfer 1108–1111) failed during a five minute period, the CDM 520 may automatically interpret this to mean that the POP was down during that period (in contrast to the embodiment above where the operations staff 515 manually includes this information in the recovery policy). Thus, if the POP is now online and accepting file transfers, the CDM 520 may direct the FTS 525 to reattempt the file transfers and/or deletions. Additional error detection and correction mechanisms may be implemented consistent with the underlying principles of the invention.

Load Balancing With Virtual Internet Protocol Addresses

Figure 12:
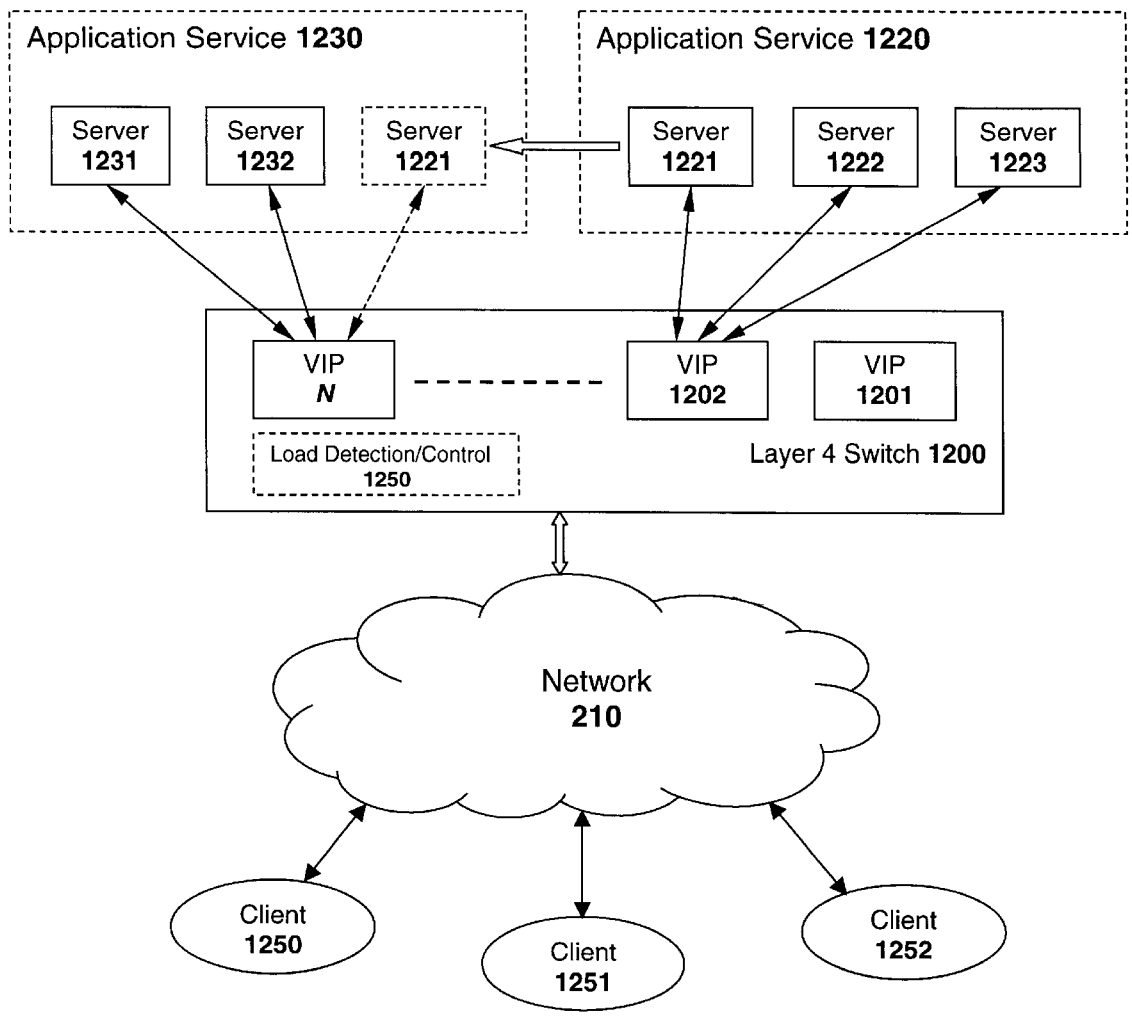
FIG. 12 illustrates dynamic server allocation according to one embodiment of the invention.

A single server will typically not be adequate for providing application services, particularly with respect to high-bandwidth applications such as live or on-demand streaming of multimedia content. Referring to FIG. 12, in such situations, the application service demand is met by making available a pool of resources, e.g., servers 1221–1223 and 1231–1232 which support the given application service 1220 and 1230, respectively. In the illustrated embodiment, load-balancing is performed such that no single server is overloaded and the application services 1220, 1230 are rendered without interruptions.

A layer 4 switch 1200 supports these requirements by identifying the particular type of service being requested by clients 1250–1252 based on a virtual IP address ("VIP") associated with that service, and directing the requests to a particular server (e.g., 1221) within the 'server pool assigned to that service. For example, if the application service 1220 is configured to handle all incoming Web page (i.e., HyperText Transport Protocol) requests, then clients connecting to VIP 1202 to download Web pages will be redirected to a specific server behind the VIP 1202 by the Layer 4 switch 1200.

In typical load balancing configurations, static groups of servers are assigned to application service pools. In one embodiment of the present system, multiple application services are deployed using dynamically configurable server pools 1221–1223; 1231–1232 for optimum resource allocation and fault-tolerance. More specifically, this embodiment allows servers (e.g., 1221) assigned to one application service 1220 to be dynamically reassigned to a second application service 1230 based on demand for that service, and or the current load on that service as indicated in FIG. 12.

For example, if it is anticipated that, at a given time, a live or on-demand streaming event will require a significant amount of server resources, then a server 1221 may be removed from a pool of non-streaming servers to a pool of streaming servers 1231–1232 in anticipation of that demand. This can be accomplished automatically or manually by the operations staff 515, and, depending on the configuration, may require rebooting the servers being reallocated.

In one embodiment, the server reallocation mechanism responds dynamically to changes in network load (rather than in anticipation of such changes). Accordingly, if a pool of servers (e.g., 1231, 1232) reserved for a particular application service 1230 suddenly experiences a significant increase in service requests, a server 1221 assigned to a second application service (e.g., 1220) may be dynamically reassigned to the first application service 1230 to handle some of the load (assuming that the second service 1220 is not also experiencing a heavy network load). In one embodiment, a monitor module running in the background keeps track of server load across different application services. When the servers supporting one service become overloaded, the monitor module will attempt to reassign one or more servers from a less active application service.

In one embodiment, the load across each of the less active application services is compared and a server is selected from the application service with the lowest average server load. In another embodiment, anticipated server load is also factored in to the reassignment decision. Thus, even though a particular application service is experiencing a low server load, a server will not be removed from that application service if it is anticipated that the application service will be heavily loaded in the future (e.g., if the application service will be used to support a highly publicized, scheduled streaming event).

In one embodiment, dynamic server reassignment is accomplished via load detection and control logic 1250 (e.g., configured on the layer 4 switch 1200 or, alternatively, within another network device) which monitors each the servers within the various application service groups 1230, 1220. In one embodiment, high and low load thresholds may be set for the servers and/or application service groups 1230, 1220. In one embodiment, when the load on servers within one group reaches the high threshold, the load detection and control logic 1250 will attempt reassign a server (e.g., server 1221) from another application group (e.g., application group 1220) only if the current load on that server (or it's application service group) is below the low threshold value.

Embodiments of the present invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the invention may be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. An error recovery method comprising:

logging one or more file operation errors in an error queue in a content distribution network, said file operation errors including a file operation portion and an error code portion;

periodically reading said file operation errors from said error queue;

determining whether automatic error recovery is possible based on an error recovery policy;

performing an automated error recovery procedure if error recovery is possible;

wherein said error recovery policy includes information as to when specified portions of said network were inoperative, information as to when particular file servers were inoperative; and information as to whether a file associated with said file operation error was not available on a specified source server.

2. The method as in claim 1 further comprising:

generating a report if error recovery is not possible.

3. The method as in claim 1 wherein said file operation errors comprise file transfer errors.

4. The method as in claim 1 wherein said file operation errors are file delete errors.

5. The method as in claim 1 wherein one of said error recovery procedures comprises:

reattempting file operations corresponding to said file operation errors if said file operations were previously attempted a number of times less than a predetermined threshold value.

6. The method as in claim 1 wherein one of said error recovery procedures comprises:

determining whether a group of said file operation errors have identical error causes over a finite period of time; and reattempting file operations corresponding to said group of file operation errors.

7. An article of manufacture including a sequence of instructions which, when executed on a processor, cause the processor to:

log one or more file operation errors in an error queue in a content distribution network, said file operation errors including a file operation portion and an error code portion;

read said file operation errors from said error queue;

determine whether automatic error recovery is possible based on an error recovery policy; and perform an automated error recovery procedure if error recovery is possible, wherein said error recovery policy includes information as to whether a file associated with said file operation error was not available on a specified source server.

8. The article of manufacture as in claim 7 including further instructions which cause said processor to:

generate a report if error recovery is not possible.

9. The article of manufacture as in claim 7 wherein said error recovery policy includes information as to when specified portions of said network were inoperative.

10. The article of manufacture as in claim 7 wherein said error recovery policy includes information as to when particular file servers were inoperative.

11. The article of manufacture as in claim 7 including further instructions defining an error recovery procedure which cause said processor to:

reattempting file operations corresponding to said file operation errors if said file operations were previously attempted a number of times less than a predetermined threshold value.

12. The article of manufacture as in claim 7 including further instructions defining an error recovery procedure which cause said processor to:

determining whether a group of said file operation errors have identical error causes over a finite period of time; and reattempting file operations corresponding to said group of file operation errors.

* * * * *

UNITED STATES PATENT AND TRADEMARK OFFICE
CERTIFICATE OF CORRECTION

PATENT NO. : 6,687,846 B1
DATED : February 3, 2004
INVENTOR(S) : Adrangi et al.

It is certified that error appears in the above-identified patent and that said Letters Patent is hereby corrected as shown below:

Column 10,
Line 61, delete "File1nfo" and insert -- FileInfo --.

Column 14,
Line 42, delete " 'server" and insert -- server --.

Signed and Sealed this

Eighth Day of June, 2004

JON W. DUDAS
*Acting Director of the United States Patent and Trademark Office*